Oct. 28, 1924.  
E. F. BORGSTEDE  
TRACTOR PLOW  
Filed Aug. 10, 1923
1,513,366
3 Sheets—Sheet 3
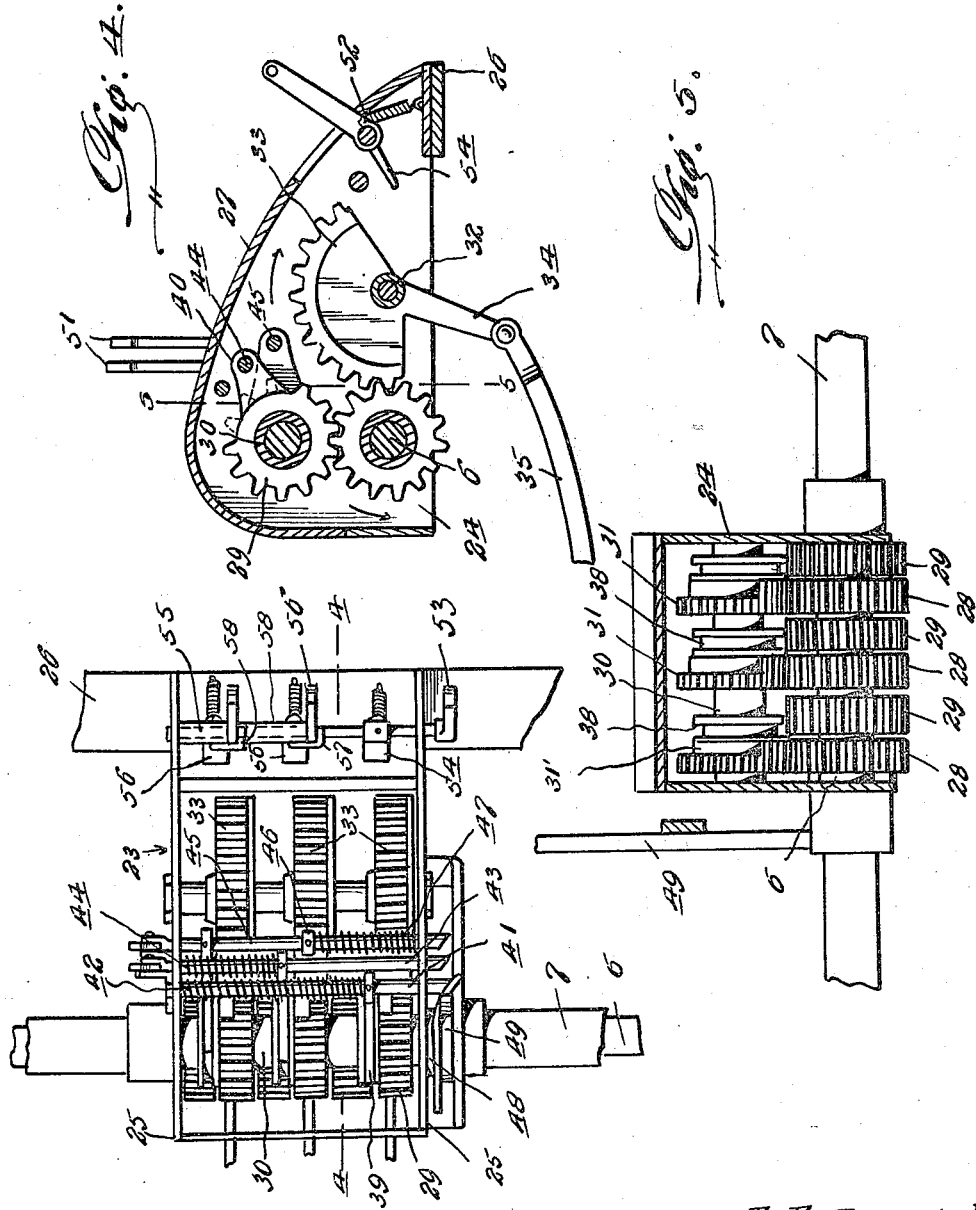
E. F. Borgstede  
Inventor
Witnesses:
Attorney Patented Oct. 28, 1924.

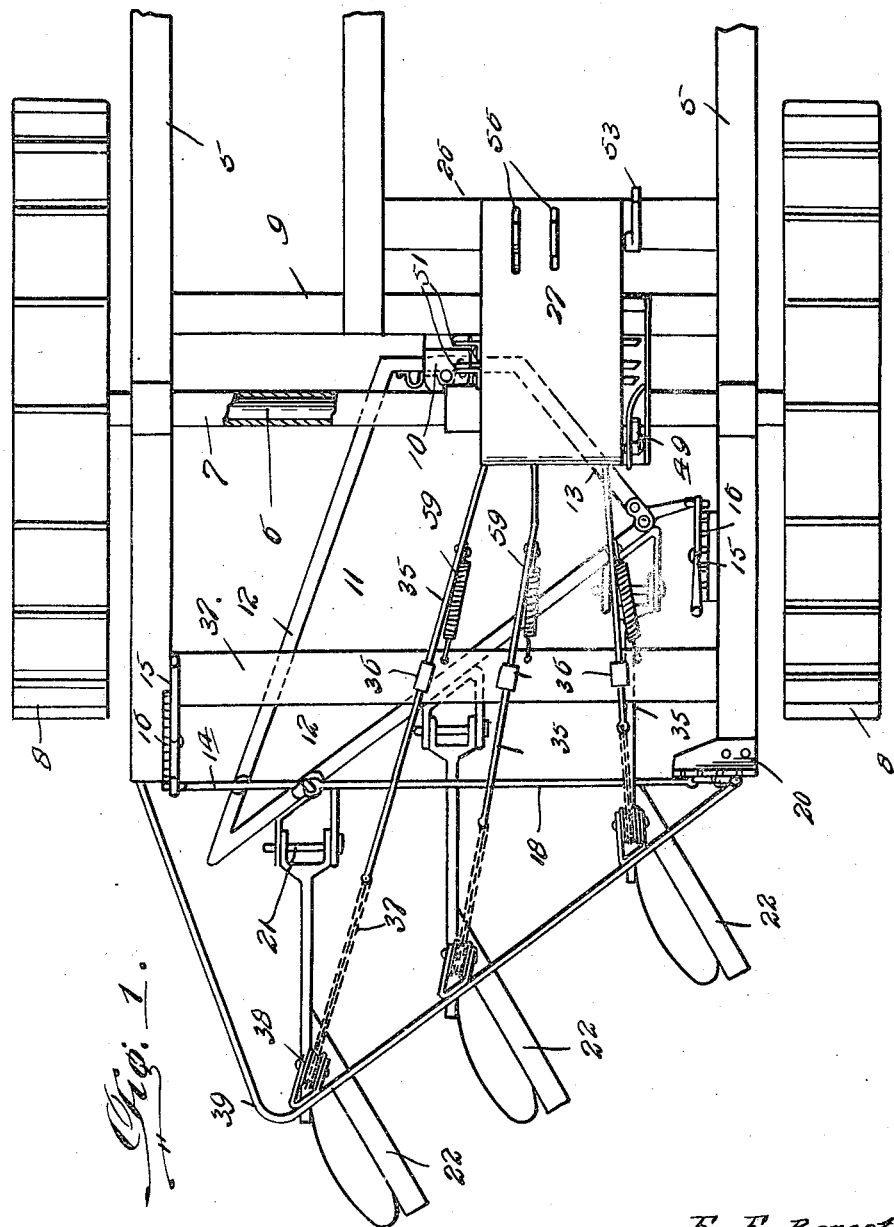

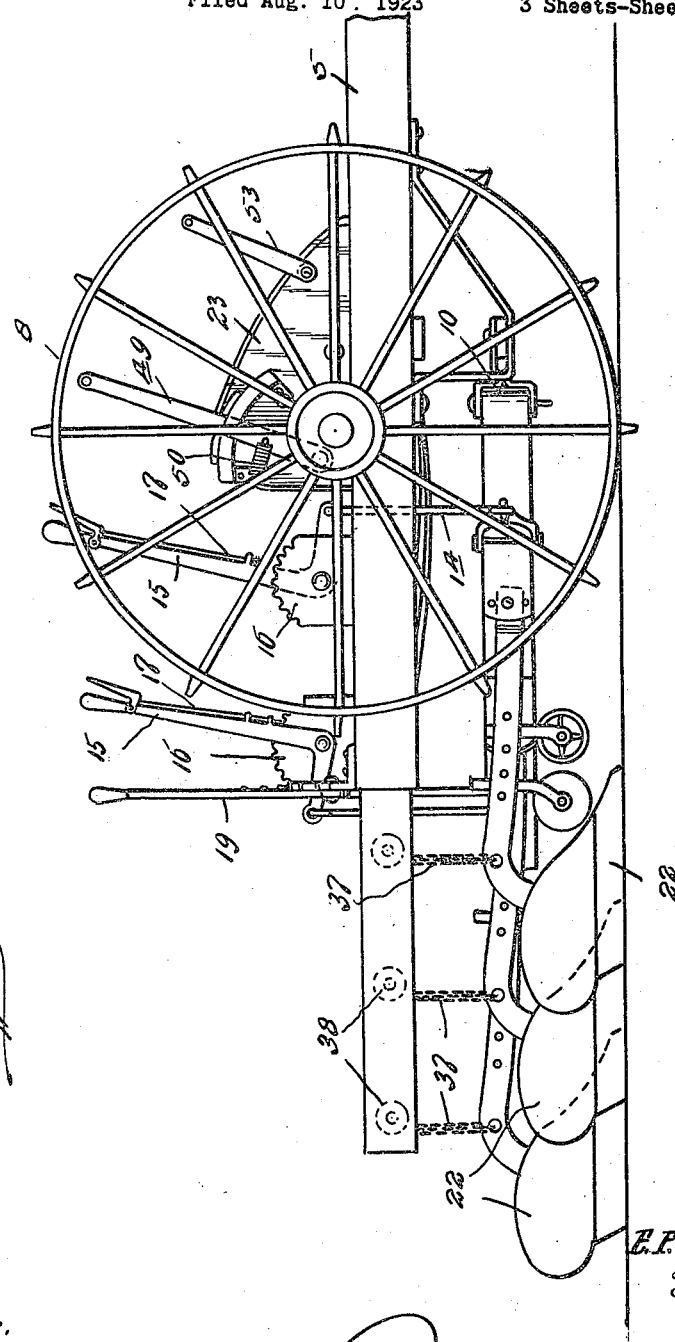

1,513,366

UNITED STATES PATENT OFFICE.

ELMER F. BORGSTEDE, OF NAPOLEON, INDIANA.

TRACTOR PLOW.

Application filed August 10, 1923. Serial No. 656,655.

*To all whom it may concern:*

Be it known that I, ELMER F. BORGSTEDE, a citizen of the United States, residing at Napoleon, in the county of Ripley and State of Indiana, have invented certain new and useful Improvements in Tractor Plows, of which the following is a specification.

In carrying out the present invention, it is my purpose to provide a highly improved form of gang plow that may be, and preferably is associated directly with a desirable form of tractor.

The primary object of my invention is the provision of such a plow that is to be associated with a tractor and has novel means for elevating any one or all of the plow elements through the motive power of the tractor.

A still further object is to provide such a gang plow that may be associated with practically all types of tractors with which I am now familiar, and wherein the plow elements may be elevated by the driving axle of the tractor or the jack shaft thereof in a novel, simple and expeditious manner.

Yet another object is to provide such a gang plow for tractors wherein the plow elements may be moved as a unit between the tractor frame for adjusting the plows laterally with respect to the previously formed furrows.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a plan view of the rear end of a conventional form of tractor equipped with my improved gang plow.

Figure 2 is a side elevation thereof.

Figure 3 is a bottom plan view of the gear assembly per se, whereby the plows are elevated through the power of the tractor.

Figure 4 is a longitudinal cross section upon the line 4—4 of Figure 3, and

Figure 5 is a detail vertical cross section taken substantially upon the line 5—5 of Figure 4.

In the drawings, I have shown the most practical embodiment of my invention, and in this instance, 5—5 indicate the usual frame bars of a well known form of tractor; 6 the rear axle thereof, which is driven in a well known manner and journaled within the housing 7; and 8 the usual traction wheels of the tractor.

Detachably, pivotally secured at one end to a cross bar 9, between the frame bars 5—5 as designated generally at 10 is a peculiar shaped floating plow frame 11. As more clearly shown in the plan view, Figure 1, this frame embodies radiating bars 12 of different lengths formed together at one end and joined together at their other ends by a somewhat L-shaped bar 13. As a means for raising and lowering this frame, there is provided links 14 adjacent the front and rear ends thereof, which are loosely connected at one end to the frame, and at their opposite ends to the lowermost arms of bell cranks 15. These bell cranks as more clearly shown in Figure 2 are pivoted to rack segments 16, and carry detents 17 for cooperation with the teeth of said racked segments, whereby the frame 11 may be maintained in proper position.

As a means for moving the said frame 11 laterally between the tractor frame bars 5—5, there is provided a relatively long link 18 that extends longitudinally across the tractor frame and is pivotally connected adjacent one end of the plow frame 11, and at its opposite end to a hand lever 19. This hand lever 19 is pivoted to a rack segment 20 and carries a suitable form of detent for cooperation with the teeth of the segment, whereby said frame may be maintained in adjusted positions between the frame bars 5—5 of the tractor.

The rearmost bar 12 included in the plow frame 11 has pivotally connected thereto in a well known manner as at 21 the beams of conventional forms of plows, preferably three in number and designated 22.

Now, having particular reference to Figures 3, 4 and 5, there is shown what I term a gear assembly, designated generally 23. This gear assembly is a highly novel and efficient means for elevating any desired one of the plow elements 22, either two or all of the same simultaneously. This gear assembly is shown as being associated with the axle 6 of a tractor, however, it is to be understood that I do not wish to limit myself to this particular application, as in the future practice of the invention, this gear assembly may be mounted upon the jack shaft of the tractor, or in fact any other shaft that may be provided to be driven by the engine as the occasion demands.

With particular reference to the application of this assembly as shown, 24 designates a housing for the gears including side walls 25, the upper edges of which are curved downwardly in a direction towards the front end of the tractor, and are supported at this end upon a cross bar 26. Upon these side walls is a removable hood designated 27. Adjacent the front ends of said side walls 24 are openings for the passage of the tractor shaft 6 therethrough. Within said housing 24 are sets of spur gears 28 and 29 respectively, the gears of each set being arranged in alternate positions with respect to each other, the gears of the set 28 being loose upon the shaft 6, while the gears of the remaining set 29 are keyed thereto. Between the side walls 25 of the housing 24 directly above the axle is a stationary shaft 30 and slidable thereupon are three clutch spur gears 31, which are normally in mesh with the gears 28 that are loose upon the shaft 6. Rockingly disposed upon a cross stationary shaft 32 within the housing 24 are three gear segments 33, the teeth thereof being always in mesh with the said gears 28 that are loose upon the shaft. Each of these segments 33 is formed with a pendent arm 34, and pivotally connected to these arms are flat-like rods 35 that extend rearwardly, and are guided through keepers 36 upon a cross bar 37 between the tractor frame bars 5—5. Connected to the other ends of these rods 35 are chain sections 37 that are extended over pulleys 38 carried by a rigid frame 39 upon the rear end of the tractor frame. The opposite ends of these chain sections 37 have connection with the before mentioned beams of the plows 32.

Again having reference to the gear assembly 23, the said clutch gears 31 are each formed with a grooved collar 38. Within the grooves of these collars are yokes 39 formed with arms 40. Connected to the arm of one of the yokes 39 is a cross rod 41, slidable within alined openings of the side walls 24 of the gear housing 23. Surrounding this rod 41 between the arm of the yoke and one of the walls 24 of said housing is an expansion spring 42, which normally maintains that particular clutch gear 31 in mesh with its respective gear 28, loose upon the shaft 6. Connected to the arm of another yoke 39 is a rod 43, which is also surrounded by an expansion spring 44 between the arm and the similar wall of the gear housing, also normally maintaining that particular clutch gear 31 in mesh with its respective loose gear 28. Also connected to the arm of the remaining yoke 39 is still another cross rod 45 slidable within openings in the side walls 24 of the gear housing, and having thereon between an abutment 46 and the opposite side wall of the gear housing a compression spring 47 that also tends to normally maintain that particular clutch gear in mesh with its loose gear 28. The rods 41, 43, and 45 have one end projecting outwardly of one side wall of the gear housing, and are bevelled as shown in Figure 3, and as a means for sliding said rods in a lateral direction for overcoming the tension of the springs surrounding the rods, there is provided a cam plate 48 carried by a hand lever 49 that is pivoted to the adjacent side wall 24 of the gear housing, and is normally retracted by a coiled spring 50. As a means for sliding the rods 43 and 45 in a similar direction irrespective of the remaining rods, the same are provided at their opposite projecting ends with hand levers 51, that are pivotally connected at their lower ends to these projecting ends of the rods, and are in turn pivotally connected to brackets upon the gear housing.

It will thus be seen that one or more of these rods may be so moved as to slide the clutch gears 31 upon the shaft 30, whereby the same will have intermesh with both the loose and stationary gears 28 and 29, respectively, upon the shaft 6, whereby during the movement of the tractor, one or all of the plows 22 will be raised, due to the movement of the gear segments 33 upon the shaft 32.

It will of course be necessary that these gear segments 33 be limited in their rocking movement upon the shaft 31, and as a means for accomplishing this purpose, each of said clutch gears 31 are formed with cut-out portions 31' in their toothed surfaces, these cut-out portions extending circumferentially of the gears a distance of about one-fourth thereof, and these cut-out portions being of a width approximately one-half of the width of the gears, whereby when the same are moved over into mesh with the keyed gears 29, these gears may be rotated by the shaft 6, without imparting a similar movement to the clutch gears.

As a means for releasing the plows 22, and for permitting the same to drop, there is provided at the front end of the housing 23 a cross shaft 52 that is journaled within openings in the side walls of the housing, and carries at one end thereof a control lever 53. Upon this shaft 52 adjacent one end thereof, and in axial alinement with the arm 34 of the adjacent gear segment 33 is a plate 54, whereby this arm 34 will be struck by a rocking of the shaft and consequently forced downwardly to the position of Figure 4, for thereby releasing that particular plow 22.

Loose upon this shaft 53 at the other end thereof is a pair of sleeves 55, each of which carries a plate 56 in axial alinement with the arms 34 of adjacent gear segments 33. These sleeves 55 are formed with control levers whereby the same may be rocked upon the shaft whenever it is desired to release the remaining plows 22. The shaft 53 carries a pin 57 that engages the adjacent plate 56 of one of the sleeves 55, and that particular sleeve 55 carries a pin 58 that engages the plate 56 of the remaining sleeve, for thereby permitting the sleeves 55 to be rocked independently of each other, and of the shaft 52, or for permitting the said sleeves 55 and the shaft 52 to be rocked simultaneously by a movement of the control lever 53, for obvious purposes.

As a means for assisting the bars 35 in a rearward direction when the gear segments 33 are moved in the direction of the arrow, Figure 4, springs 59 are provided, connected at one end to the bars 35 and at their opposite ends to the said cross bar 37 between the tractor frame bars 5—5.

In view of the above description when considered in conjunction with the accompanying drawings, numerous advantages of a tractor plow of this class will present themselves to those skilled in the art, and even though I have herein set forth the most practical embodiment of the present invention with which I am now familiar, it is nevertheless to be understood that minor changes may be made therein, without departing from the spirit and scope of the invention as claimed.

Having thus described my invention, what I claim as new, and desire to secure by Letters-Patent, is:

In a tractor plow of the class described, a floating frame supported at the rear end of said tractor, plow elements pivoted to said frame, means operable by a power shaft of the tractor for elevating said plows, and means for raising and lowering said floating frame, together with means for moving said frame in lateral directions beneath the tractor frame.

In testimony whereof I affix my signature.

ELMER F. BORGSTEDE.